United States Patent [19]
Green et al.

[11] Patent Number: 6,163,019
[45] Date of Patent: Dec. 19, 2000

[54] RESONANT FREQUENCY INDUCTION FURNACE SYSTEM USING CAPACITIVE VOLTAGE DIVISION

[75] Inventors: Daniel Green, Clark, N.J.; Robert Ibach, Schwerte; Jan Fablanowski, Dortmund, both of Germany

[73] Assignee: ABB Metallurgy, North Brunswick, N.J.

[21] Appl. No.: 09/435,043

[22] Filed: Nov. 8, 1999

Related U.S. Application Data

[60] Provisional application No. 60/122,994, Mar. 5, 1999.

[51] Int. Cl.$^7$ .............................. H05B 6/04; H05B 6/06; H02M 3/24
[52] U.S. Cl. ............................ 219/660; 363/98; 363/62; 363/131; 363/95; 373/147; 373/148; 373/149; 373/150; 219/661; 219/662; 219/663; 219/664; 219/665; 219/666
[58] Field of Search ............................ 363/98, 131, 62, 363/95; 373/147, 148–150; 219/660–666

[56] References Cited

U.S. PATENT DOCUMENTS

| | | | |
|---|---|---|---|
| 3,121,835 | 2/1964 | Diebold | 321/15 |
| 3,821,627 | 6/1974 | Milovancevic | 321/2 |
| 3,867,563 | 2/1975 | Laflin | 373/148 |
| 4,112,286 | 9/1978 | Alderman et al. | 219/668 |
| 4,280,038 | 7/1981 | Havas et al. | 219/10.77 |
| 4,307,276 | 12/1981 | Kurata et al. | 219/10.41 |
| 4,357,706 | 11/1982 | Kidowaki | 373/104 |
| 4,382,275 | 5/1983 | Glennon | 363/41 |
| 4,506,131 | 3/1985 | Boehm et al. | 219/10.77 |
| 4,749,836 | 6/1988 | Matsuo et al. | 219/626 |
| 4,820,891 | 4/1989 | Tanaka et al. | 219/626 |
| 4,847,746 | 7/1989 | Rilly et al. | 363/132 |
| 4,916,599 | 4/1990 | Traxler et al. | 363/65 |
| 5,059,762 | 10/1991 | Simcock | 219/10.77 |
| 5,079,399 | 1/1992 | Itoh et al. | 219/10.77 |
| 5,165,049 | 11/1992 | Rotman | 323/212 |
| 5,250,777 | 10/1993 | Fishman | 219/619 |
| 5,272,719 | 12/1993 | Cartlidge et al. | 373/138 |
| 5,343,023 | 8/1994 | Geissler | 219/661 |
| 5,349,167 | 9/1994 | Simcock | 219/662 |
| 5,352,872 | 10/1994 | Tsuji et al. | 219/660 |
| 5,412,557 | 5/1995 | Lauw | 363/37 |
| 5,438,588 | 8/1995 | Wanner | 373/108 |
| 5,508,497 | 4/1996 | Fabianowski et al. | 219/663 |
| 5,523,631 | 6/1996 | Fishman et al. | 307/38 |
| 5,561,597 | 10/1996 | Limpaecher | 363/59 |
| 5,571,438 | 11/1996 | Izaki et al. | 219/625 |
| 5,666,377 | 9/1997 | Havas et al. | 373/147 |
| 5,773,799 | 6/1998 | Maxfield et al. | 219/661 |
| 5,777,864 | 7/1998 | Seong et al. | 363/98 |
| 5,912,812 | 6/1999 | Moriarty, Jr. | 363/89 |
| 5,946,208 | 8/1999 | Yamamoto et al. | 363/132 |
| 6,064,584 | 5/2000 | Cornec et al. | 363/95 |

*Primary Examiner*—Teresa Walberg
*Assistant Examiner*—Jeffrey Pwu
*Attorney, Agent, or Firm*—St. Onge Steward Johnston & Reens, LLC

[57] ABSTRACT

An induction furnace having a voltage source series inverter, a load circuit having a combination of an induction coil and a resonating capacitor bank, and control circuitry to phase lock the inverter frequency to the natural resonant frequency of the load. The capacitor bank can be divided into two groups, one across the output of the inverter and the other in series with the load. This arrangement allows for the division of the inverter voltage across the furnace coil according to the ratio of the two capacitances. The inverter uses pulse width modulation and is buffered from the load circuit by means of a small series connected inductor. Additionally, the system can have a common power supply system that supplies power in any desired proportion to a plurality of induction furnaces.

29 Claims, 10 Drawing Sheets

6,163,019

RESONANT FREQUENCY INDUCTION FURNACE SYSTEM USING CAPACITIVE VOLTAGE DIVISION

PRIOR APPLICATION

This is a Continuation in part of prior provisional patent application Ser. No. 60/122,994 filed Mar. 5, 1999, all contents of which are incorporated herein by reference thereto.

FIELD OF THE INVENTION

The invention relates to an apparatus for an induction furnace. More specifically, the invention relates to an induction furnace with a control circuit using pulse width modulation to drive a resonant load circuit.

BACKGROUND OF THE INVENTION

Induction furnace systems for melting metal, known as a melt charge, have typically been powered by means of two types of inverter topologies, a voltage source series inverter or a current source parallel inverter. Generally, both have some advantages and disadvantages.

For a voltage source series inverter, a rectifier takes the alternating current supplied by the electric utility and converts it to direct current. This direct current is filtered and smoothed by a large capacitor bank, then applied to a full or half bridge inverter. The load circuit connected to the output terminals of the inverter typically consists of a series network formed by an induction coil and a resonant capacitor bank.

An example of a voltage source series inverter is disclosed in U.S. Pat. No. 5,165,049 to Rotman, which discloses a phase difference control circuit for an induction furnace power supply. The Rotman induction furnace controls the phase difference between the voltage and the current delivered to the load to control the power delivered to the load. The Rotman induction furnace, however, does not operate at a resonant frequency and thus does not maximize the energy transferred to the melt charge.

U.S. Pat. No. 5,343,023 to Geissler discloses an induction heater that uses pulse width modulation to control the power output to the induction heater. The Geissler apparatus, however, uses two inverters for one induction coil, one inverter that outputs at a constant frequency and another that outputs at a varying frequency to control the power output.

Advantages of the voltage source series inverter typically include simple control circuitry and full control range by means of varying the inverter firing frequency. Another advantage is the possibility to run the inverter from standard plant voltages for some ratings. Disadvantages typically include a difficulty of providing protection from arcing faults in the load coil, difficulty of clearing faults in the inverter, high resonant currents in the inverter circuitry and the difficulty of sharing current equally between many paralleled thyristors comprising the inverter structure.

The second type of inverter used in induction furnace systems is the current source parallel inverter. In this type of inverter, the three phase AC voltage supplied by the utility is converted to DC by means of a rectifier. The direct current is then passed through a large inductor which smoothes and filters the current. The filtered current is applied to a full bridge inverter. The load circuit consists of the induction coil and a parallel connected resonant capacitor bank, with a small inductor connected between the capacitor bank and the inverter output terminals for purposes of limiting the maximum rate of rise of the current.

U.S. Pat. No. 5,508,497 to Fabianowski et al. discloses the control of at least two current source parallel inverters feeding induction furnaces. For the Fabianowski apparatus, one rectifier provides an adjustable level of power for a plurality of inverters, each having its own induction furnace. The produced rectifier output at each moment is equivalent to the sum of the power of all parallel circuit inverters. Thus, only one rectifier is needed for a plurality of induction furnaces. The Fabianowski apparatus, however, operates at a frequency above the resonant frequencies of the load circuits.

Advantages of the current source parallel inverter typically include high reliability, easy clearing of load circuit faults, and no high resonant current in the inverter. Disadvantages typically include complex controls, a large DC filtering inductor and limited control range of the inverter which requires pre-regulation of the DC voltage. Furthermore, if a phase controlled rectifier is used as a pre-regulator, the power factor over a lower part of the control range is not optimal.

It is also advantageous to use a plurality of induction furnaces connected to a common power source. U.S. Pat. No. 5,508,497 to Fabianowski et al. discloses such a system to decrease the maximum amount of power used at any one time. U.S. Pat. No. 5,272,719 to Cartlidge et al. discloses a system that uses a single power supply to feed an induction holding furnace and an induction melting furnace.

What is desired, therefore, is an induction furnace converter that reliably operates at the resonant frequency of the load circuit without susceptibility to major damage from load circuit faults and that operates with a satisfactory power factor at all utility power levels. Additionally, it desired to have a induction furnace system that uses a common power supply to supply power to a plurality of induction furnaces.

SUMMARY OF THE INVENTION

Accordingly, an object of the present invention is to provide an induction furnace system that has a load circuit which includes a capacitive network that divides an inverter voltage output to apply a satisfactory operating voltage across the induction coil, and that has a load circuit which operates at a resonant frequency, thus providing the most efficient power transfer between the inverter and the load circuit.

It is a further object of the present invention to provide an induction furnace system having a wide power control range and high power factor at all utility power levels.

It is yet another object of the present invention to provide an induction furnace system that does not use large, costly inductors.

It is still another object of the present invention to provide an induction furnace system that is easy to protect from load circuit faults.

It is still a further object of the present invention to provide an induction furnace system that can use standard plant voltages.

It is still yet a further object of the present invention to provide an induction furnace system that uses a common power supply to supply power in any desired proportion to a plurality of induction furnaces.

These objects of the invention are achieved by an induction furnace system that comprises a voltage source inverter, a load circuit having an induction coil and a networked capacitor bank, and control circuitry to phase lock the inverter frequency to the natural resonant frequency of the load. The networked capacitor bank can be divided into two groups, one in parallel with the output of the inverter and the other in series with the load. This arrangement allows for the voltage division of the inverter output voltage according to the ratio of the two capacitances. The inverter can use pulse width modulation and can be buffered from the load circuit by means of a small series connected inductor. Additionally, the system can have a common power supply system that supplies power in any desired proportion to a plurality of induction furnaces.

DETAILED DESCRIPTION OF THE INVENTION

Figure 1:
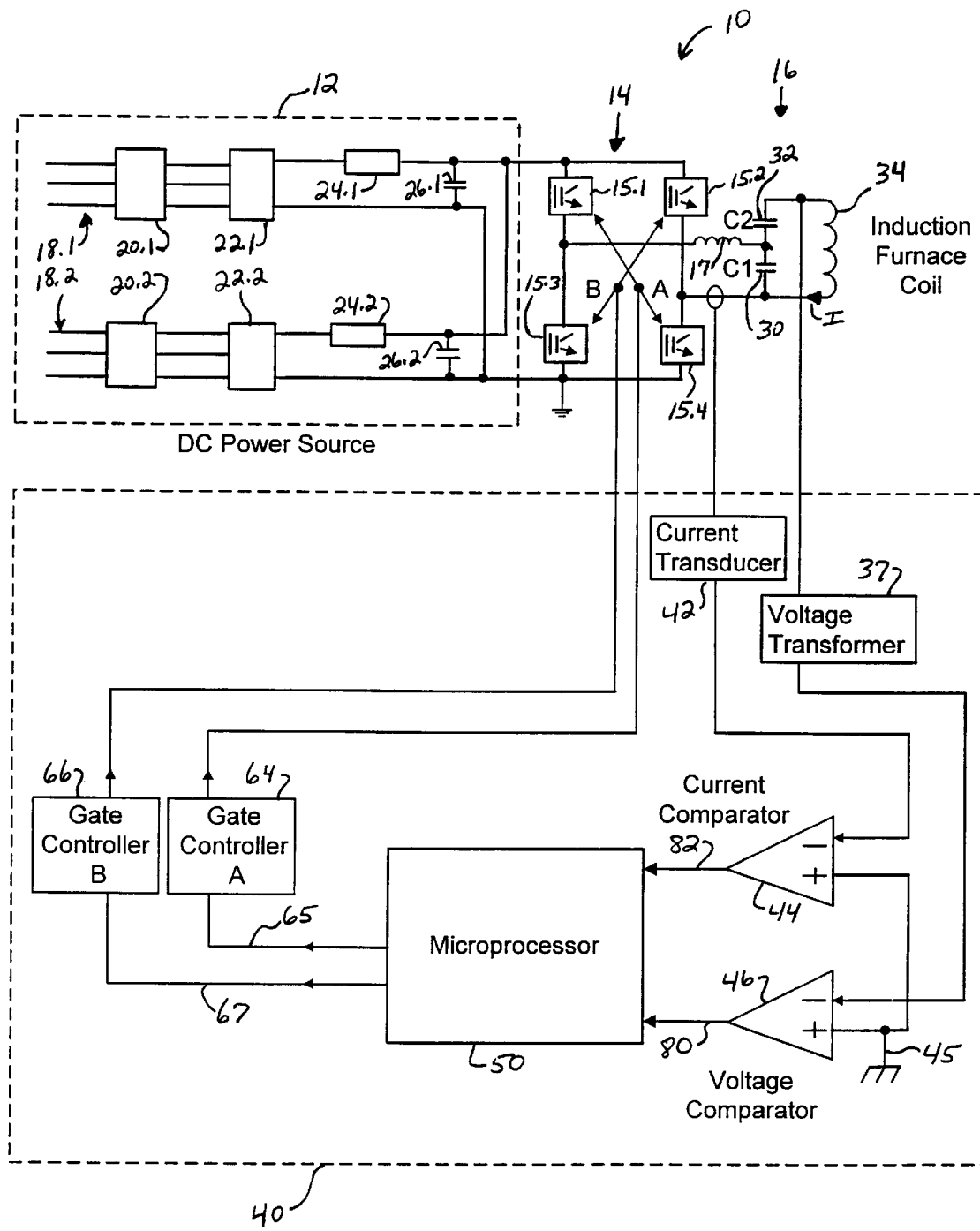
FIG. 1 is a schematic diagram of the induction furnace system of the present invention.

Referring to FIG. 1, the direct current (DC) power supply 12 preferably uses two three phase utility supply voltages 18.1, 18.2, which may typically be a relatively low standard plant voltage, such as 460 or 575 volts. The three phase sources 18.1, 18.2, each have a circuit breaker 20.1, 20.2, which are provided for the functions of isolation disconnect and back up overcurrent protection. The circuit breakers 20.1, 20.2 supply power to a pair of six pulse full bridge rectifiers 22.1, 22.2 to convert the three phase AC voltage 18 to DC voltage as is typically done for a high power inverter with a twelve pulse rectification scheme.

The rectifiers 22.1, 22.2 preferably use thyristors. The voltage phase angles of the thyristors are increased during the initial application of voltage to the two filter capacitor banks 26.1, 26.2. Typically, the supply voltages in a twelve pulse rectifier are phase shifted by thirty degrees by means of appropriately selected supply transformer phasing. In an alternate embodiment, for lower power applications, only one of the two six pulse rectifiers 22.1, 22.2 shown would be used.

Reactors 24.1, 24.2 are connected to the output of the rectifiers 22.1, 22.2. One purpose of the reactors 24.1, 24.2 is to minimize inrush currents and associated utility supply voltage 18.1, 18.2 disturbances which would otherwise result during the initial charging of the capacitor banks 26.1, 26.2.

An other purpose of the reactors is to further filter the fluctuations in the DC current to a level that is lower than would be obtainable with capacitors 26.1, 26.2 alone. The two capacitor banks 26.1, 26.2 filter the voltage from the reactors 24.1, 24.2. Although two capacitor banks 26.1, 26.2 are shown, it should be apparent that the capacitor banks are connected in parallel and thus act as one capacitor bank.

The DC voltage from capacitor banks 26.1, 26.2 is applied across a full bridge insulated gate bipolar transistor (IGBT) inverter 14. The IGBT is a recently developed semiconductor switch that has desirable properties for use in power switching such as low switching losses, ease of paralleling and high current handling capability. Although the invention is described for an IGBT based PWM inverter, other power electronic switching devices can be used, including but not limited to thyristors, GTO thyristors, IGCTs, transistors, and power MOSFETs. The inverter 14 converts the applied DC voltage to a pulse width modulated, alternating output voltage at the inverter output terminals 28.

The alternating output voltage 28 of the inverter 14 preferably passes through a small inductor 17 whose purpose is to integrate the current pulses from the inverter 14 and limit the rate of rise of current through the inverter switching devices (IGBTs) 15.1, 15.2, 15.3, 15.4 into the lower group of capacitors 30 in the split capacitor bank. Because the value of inductance of inductor 17 is small, it does not significantly change the frequency characteristics of the load circuit 16. Through use of the inductor 17, the switching losses in the inverter power switching devices 15.1, 15.2, 15.3, 15.4 are also minimized because the rate of rise of current through the power switching devices is limited.

The inverter current 79 passes through the inductor 17 into capacitive voltage divider capacitor banks 30, 32. The capacitor bank 30, 32 is divided into two groups. The ratio of the capacitance of the two capacitor banks 30, 32 is selected so as to provide the required voltage division or transformation ratio from the voltage at inverter output 28 to the required voltage for the induction coil 34. The resonance of the induction coil 34 with the capacitor banks 30, 32 provides the requisite voltage division without additional power losses as would be with an inductive voltage transformer. This low loss capacitive voltage division is a principal advantage of the present invention with respect to economical adaptation of various supply voltages 18.1, 18.2 to various furnace coil operating voltages.

To determine the values of capacitor banks C1, 30 and C2, 32 the total reactive power rating required for the capacitor banks must first be determined. The power rating for the compactors 30, 32 is determined by the equation:

$$kVARVmax = kVARtot \cdot \left[\left(\frac{Vc1max + Vc2max}{Vnom}\right)^2\right]$$

where
$kVAR_{TOT}$ (measured in kVAR), which is the total reactive power of the induction furnace coil 34 which must be compensated for by the two capacitor banks 30, 32 to obtain resonance.

$V_{NOM}$ is the nominal operating voltage of the induction furnace coil at its rated power, $V_{C1MAX}$ is the maximum rated voltage of the capacitor bank C1, 30 connected across the output terminals 28 of the inverter 14, and $V_{C2MAX}$ is the maximum rated voltage of the second capacitor bank C2, 32 which is connected in series between the first capacitor bank C1, 30 and the load coil 34.

Next, the values of $kVAR_{C1}$ and $kVAR_{C2}$ are determined. $kVAR_{C1}$ is the reactive power to be supplied by the C1 capacitor bank 30 at the rated voltage of the induction coil 34, and $kVAR_{C2}$ is the reactive power of the C2 capacitor bank 32 at the rated voltage of the inductor 34. These values are determined by the equations:

$$kVARc1 := \frac{Vc1max}{Vc1max + Vc2max} \cdot kVARVmax \text{ and}$$

$$kVARc2 := \left(\frac{Vc2max}{Vc1max + Vc2max}\right) \cdot kVARVmax$$

Finally, the values of the C1, 30 and C2, 32 capacitor banks in microFarads are determined by the equations:

$$C1 := \frac{kVARc1 \cdot 1000}{\left[\left(\frac{Vc1max}{1000}\right)^2 \cdot 2 \cdot \pi \cdot Fnom\right]} \text{ and}$$

$$C2 := \frac{kVARc2 \cdot 1000}{\left[\left(\frac{Vc2max}{1000}\right)^2 \cdot 2 \cdot \pi \cdot Fnom\right]}$$

where $F_{NOM}$ is the nominal operating frequency in Hertz of the induction heating coil under the operating conditions for which it was designed.

The ratio of voltage transformation from the inverter output voltage to the induction coil operating voltage can be calculated by the equation:

$$\frac{(C1 + C2)}{C1}.$$

As an example of calculating the capacitor values, for a total reactive power of the induction furnace coil 34 being $kVAR_{TOT}$=1691 kVAR, the maximum rated voltages of the first 30 and second 32 capacitor banks being $V_{C1MAX}$=2000 Volts and $V_{C2MAX}$=1100 volts, the value of $kVARV_{MAX}$ will be 1834 kVAR. The values of $kVAR_{C1}$ and $kVAR_{C2}$ will be 1183 kVAR and 650.7 kVAR, respectively. Next, for the nominal operating frequency of the induction coil being $F_{NOM}$=60 Hertz, the values of C1, 30 and C2, 32 will be 784 and 1427 microFarads, respectively. In this example, the ratio of the operating voltages of capacitors C1, 30 to C2, 32 is approximately 1:2. For these capacitor values, the voltage transformation ratio of the inverter output voltage, $V_{C1MAX}$= 2000 Volts, to the induction coil operating voltage, 3000 Volts, is approximately 2:3.

Figure 2:
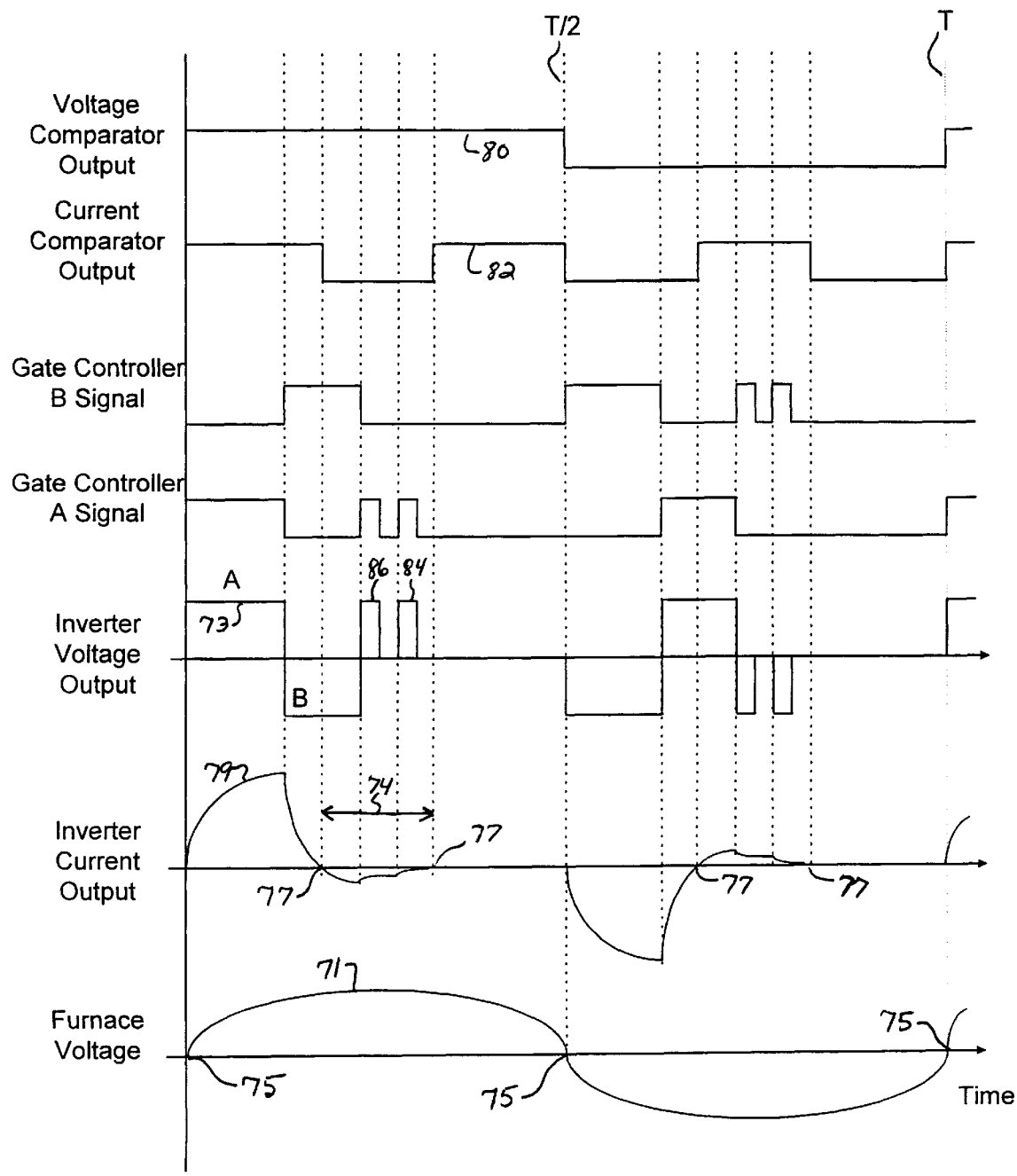
FIG. 2 is a timing diagram of several of the output waveforms of the control circuitry, the inverter output voltage and current, and the furnace coil voltage for the induction furnace system of FIG. 1.
Figure 3:
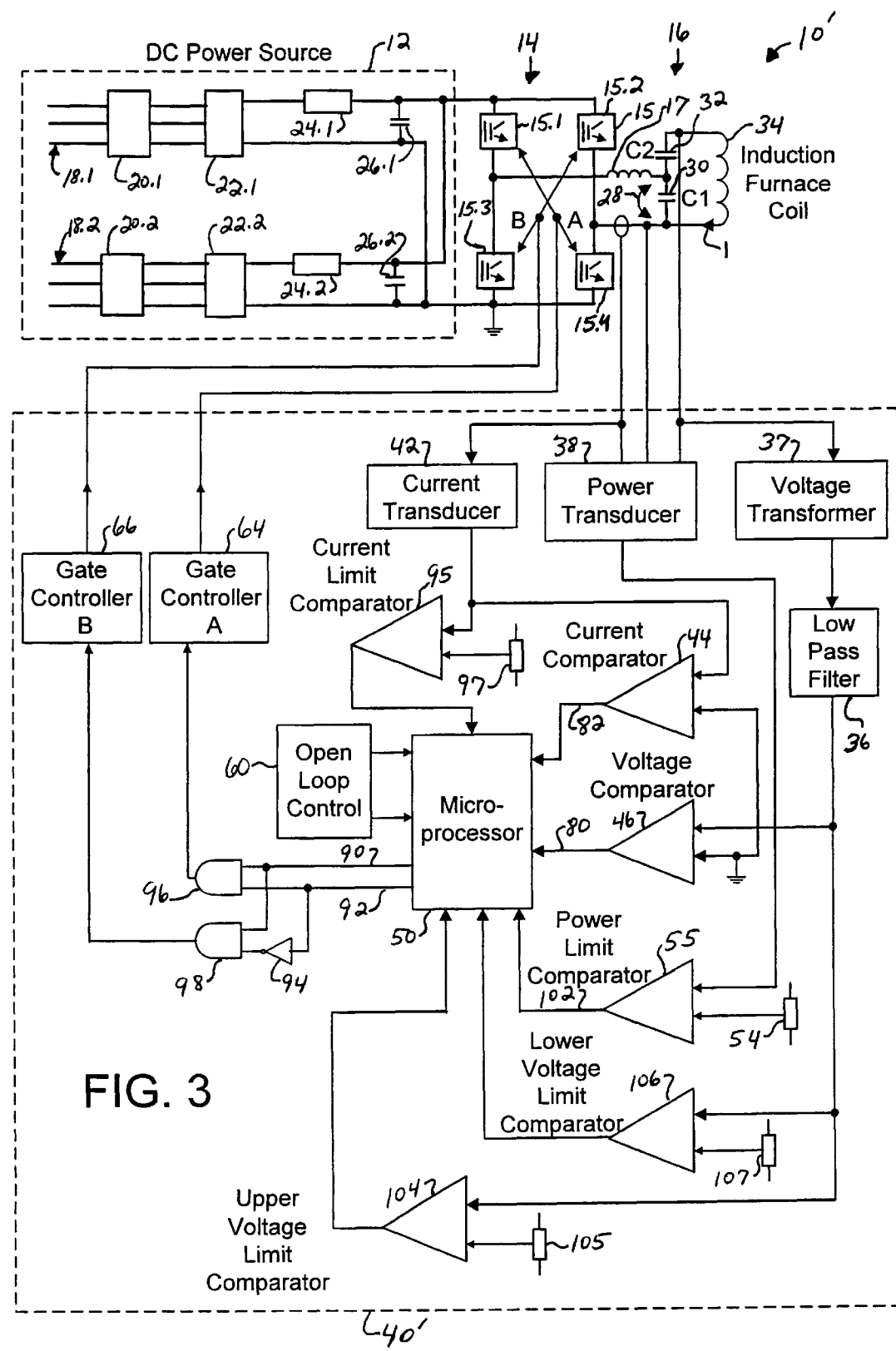
FIG. 3 is a schematic diagram of the preferred embodiment of the induction furnace system of the present invention.
Figure 4:
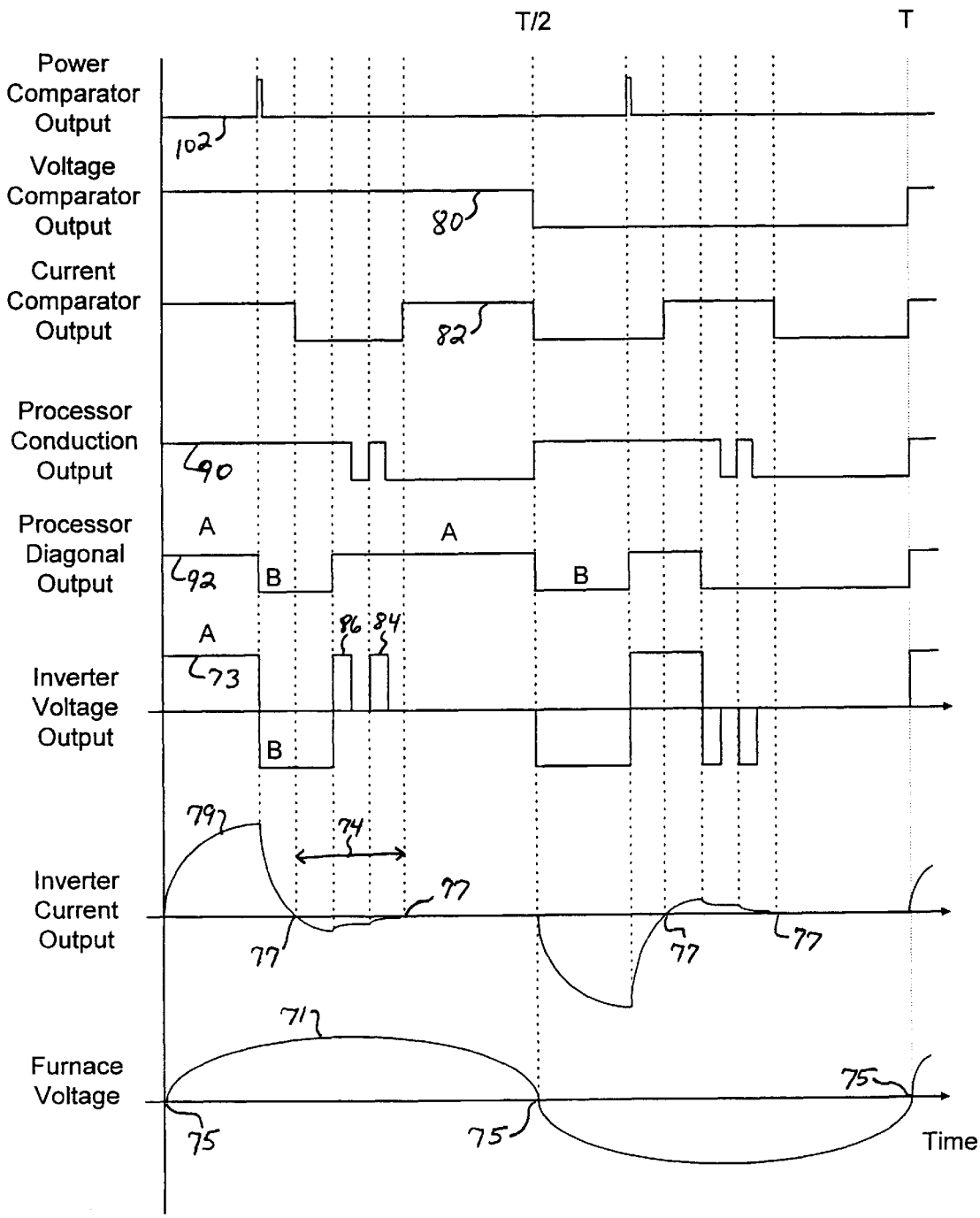
FIG. 4 is a timing diagram of several of the output waveforms of the control circuitry, the inverter output voltage and current, and the furnace coil voltage for the induction furnace system of FIG. 3.

As shown in FIGS. 1 and 3, the voltage and current comparators 46, 44 determine when the alternating voltage and current signals, respectively, of the induction furnace coil 34 cross a reference potential. This reference signal as shown in FIG. 1 is preferably ground although other signal potentials could be used as a reference. The voltage across the furnace coil is applied to a voltage transformer 37, the output of which is applied to the input of voltage comparator 46. The current signal from the output terminals 28 of the inverter is applied to a current transducer 42, the output of which is applied to the input of current comparator 44. The square wave output signals from these comparators 44, 46 are applied to the input terminals of microprocessor based controller 50. The output 80 of the voltage comparator 46 is used to determine the natural resonant frequency of the load circuit from the furnace voltage ground crossings 75 as shown in FIGS. 2 and 4. The output 82 of the current comparator 44 is used to reduce the inverter current 79 resulting from the inverter voltage pulses 73. For simplicity, element numbers in FIG. 1 and 3 that point to connections such as 80 and 82 also refer to the respective signals as shown in the other Figures.

The processor 50 outputs two signals, the gate controller A signal 65 and gate controller B signal 67, which controls the gate controllers A 64 and B 66, respectively. The microprocessor 50 preferably provides a varying width pulse in identical sets of two such that the inverter can produce both a positive and a negative output voltage having the same magnitude and duration during each period of the load circuit's resonant frequency.

The inverter 14 produces an alternating current I through the load circuit 16 by switching the diagonals A and B on and off. Diagonal A includes switches 15.1 and 15.4. Diagonal B includes 15.2 and 15.3

Figure 6:
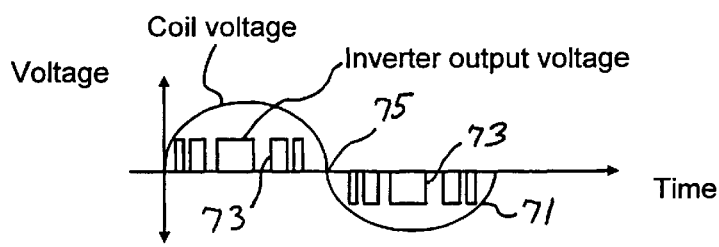
FIG. 6 is a graph of the induction furnace output voltage of the system of FIG. 3 wherein the inverter output applies multiple voltage pulses per half cycle across the load circuit.

Inverter 14 uses a control mode with pulse width modulation (PWM). In this type of control, the switching devices 15.1, 15.2, 15.3, 15.4 in the inverter 14 are turned fully on for a variable length of time within each half cycle of the output voltage. The power at the output terminals 28 of the inverter 16 is controlled by means of varying the width of the inverter 14 output voltage pulses. The number of voltage pulses of the inverter 16 per half cycle can be as low as one or as high as several hundred, depending on the required output frequency. In a deterministic pulse width modulated controller such as the one described herein, the repetition rate of the inverter voltage pulses is fixed at one or more times the maximum required output frequency. Preferably, the present invention uses only one pulse per half cycle as shown in FIGS. 2 and 4. Alternatively, the typical furnace coil output voltage waveform that would be obtained with multiple pulses per half cycle is shown in FIG. 6.

The ratio of maximum output frequency to carrier frequency partly determines the size of the inductor 17 connected between the output of the inverter 14 and the input of the capacitor bank required to obtain a given smoothing effect on the current. Since the load 16 is a parallel resonant circuit which provides a filtering action on the voltage waveform, one pulse per half cycle is sufficient for most cases from 60 hertz and higher rated resonant frequency to obtain a nearly sinusoidal voltage waveform.

The induction furnace control circuitry 40, 40' as shown in FIGS. 1 and 3, keeps the inverter switching frequency synchronized with the natural resonant frequency of load circuit 16 by phase locking the inverter output voltage pulses 73 with the natural resonant frequency of the load circuit 16. The detection of voltage zero crossings 75 as described below provides a means of synchronizing the inverter 14 switching frequency to the natural resonant frequency of the resonant load coil circuit 16.

Figure 8:
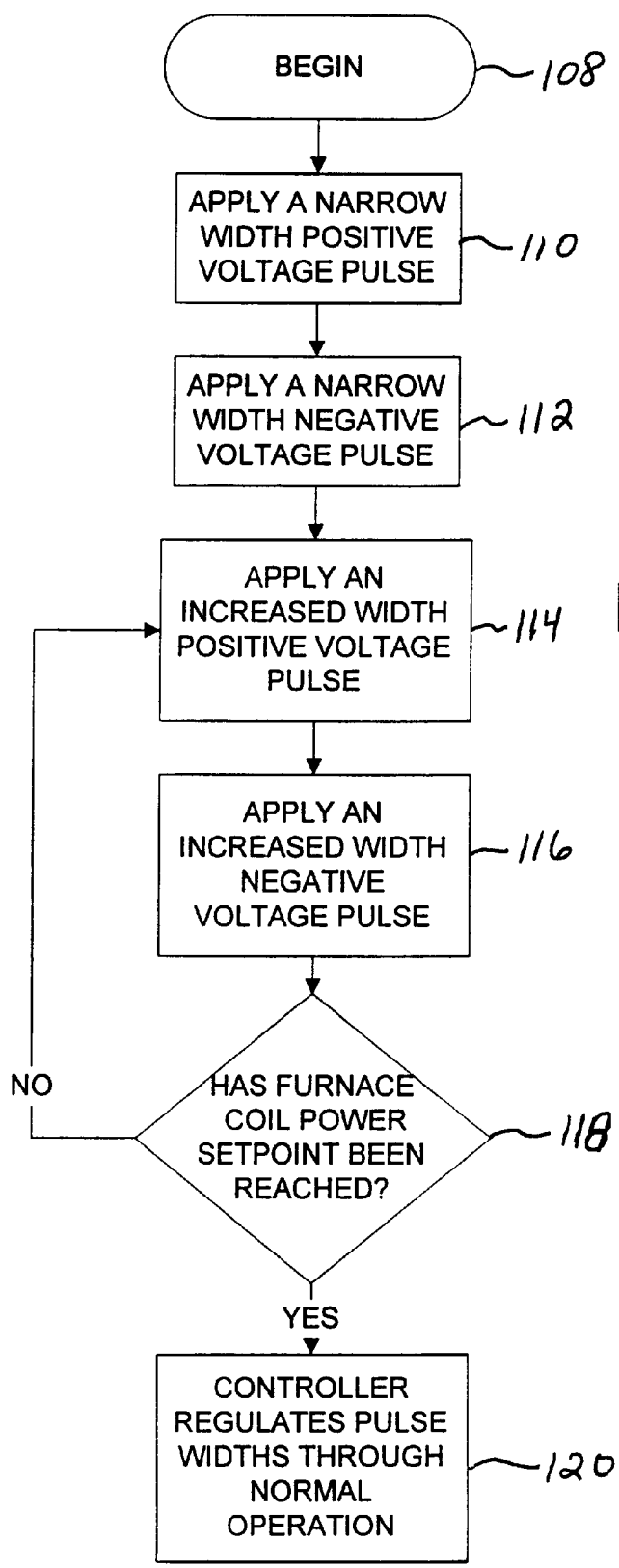
FIG. 8 is a flow diagram of the start up procedure of the induction furnace of FIG. 3.

The startup of the induction furnace system 10, 10' is accomplished by initiating a switching sequence that begins with a small pulse width and ramps up to a pulse width which satisfies a pre-set power level. Referring to FIGS. 4 and 8, the start procedure generally begins 108 with the application of a short positive pulse 76 on diagonal A 110 followed by the same short pulse width 76 on the diagonal B 112. This initial conduction time is predetermined and may be, for example, a value approximately equal to 5 percent of the nominal half cycle time period. Then diagonals A and B are switched on sequentially, this time with slightly longer conduction times 114, 116. The process repeats with increasing pulse widths over a time period until the pulse width is wide enough to provide the required power and attain the power setpoint 118. Preferably, this time period is between a range of 0.1 to 10.0 seconds and is programmable through software. Once this setpoint is reached, the microprocessor 50 regulates the pulse width on times 120 as required to maintain the set power level.

At the end of each voltage pulse from the inverter 14, the microprocessor 50 initiates a switch off routine to control how the current from each inverter pulse is switched off. Because it is impossible to switch off all the inverter IGBT's and thus the inverter current instantaneously, a "soft switch off" procedure is used to implement a switching sequence, which is most clearly seen in FIG. 4 by referring to the inverter voltage output 73 and inverter current output 79. To facilitate the operation of the switch off procedure, the output of the current comparator 44 is used to determine the times when the inverter output current 79 crosses ground 77. The switch off procedure is generally showed in FIGS. 9A and 9B by steps 130, 132, 134, 136, 138 for one diagonal and 130, 132, 134, 136, 138 for the opposite diagonal, but can also include steps 140, 142, 160 and 162.

FIG. 2 shows several of the signals of the induction furnace system 10, including the furnace coil voltage 71, the inverter output current 79, the inverter output voltage 73, the current comparator output signal 82, the voltage comparator output signal 80, and the processor outputs 90, 92. These signals are shown over one full cycle T of the induction furnace voltage 71.

The preferred embodiment of the induction furnace system 10' is shown in FIG. 3, which further includes a power limit comparator 55, a power transducer 38 upper 104 and lower 106 voltage limit comparators, a low pass filter 36 and logic gates 94, 96 and 98 to control gates controllers A 64 and B 66. Elements in FIG. 3 having the same numbers as in FIG. 1 are the same and will not be described again for brevity.

The processor 50 outputs two signals, the processor conduction output 90, which controls when the inverter diagonals will be conductive, and the processor diagonal output 92, which controls which of the diagonals will be active. The processor diagonal output 92 can be derived from the output signal of the voltage comparator 46. The microprocessor 50 preferably provides a varying width pulse in identical sets of two such that the inverter can produce both a positive and a negative output voltage having the same magnitude and duration during each period of the load circuit's resonant frequency. To control the two gate drivers 64, 66, the processor on-time output 90 and the processor sync output 92 are connected to two AND gates 96, 98 and an inverter 94 as shown in FIG. 3. It should be apparent that the gate control logic signals generated by the two AND gates 96, 98 and the inverter 94 could alternatively be generated internally in the microprocessor 50 as shown in FIG. 1.

Microprocessor 50 also receives an output signal from a power limit comparator 102, a lower voltage limit comparator 106 and an upper voltage limit comparator 104. The power limit comparator output 55 is used to determine the width of the inverter output pulses. The power limit comparator 102 compares the signal from a power reference setpoint 54 and the power feedback signal obtained from a power transducer 38. When the microprocessor 50 receives a signal that the power setpoint has been reached, the system will turn off the corresponding inverter diagonal.

The lower voltage limit comparator 106 and the upper voltage limit comparator 104 are used to detect out of range inverter voltages. The power limit comparator 102, the lower voltage limit comparator 106 and the upper voltage limit comparator 104 use reference signals from potentiometers 54, 107 and 105, respectively. All reference signals can also be obtained from digital inputs programmable through software.

In the preferred embodiment of FIG. 2, the stepped down voltage of the external potential transformer 37 is then applied to a low pass filter 36. The filter 36 preferably has a variable time constant adjustable through software.

The output of signal from the filter 36 is applied to the voltage comparator 46, the lower voltage limit comparator 106 and the upper voltage limit comparator 104.

Figure 5:
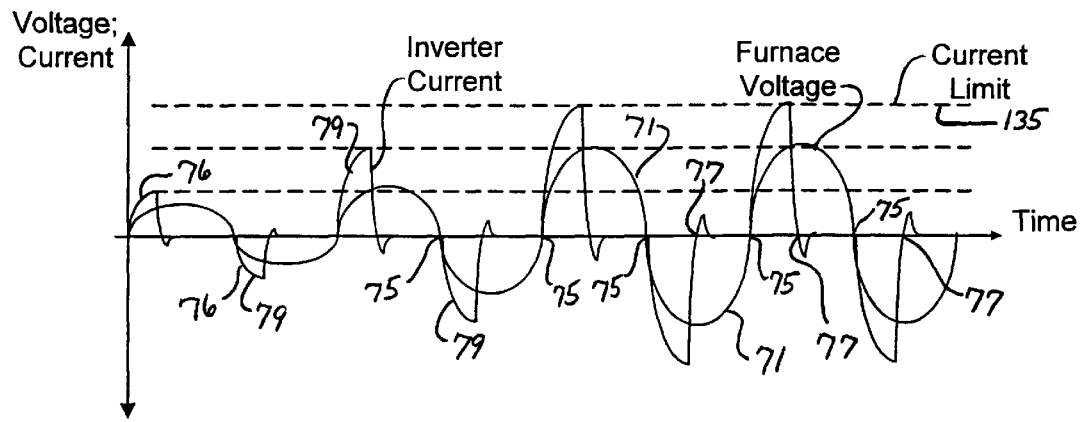
FIG. 5 is a graph showing the furnace coil output voltage and the inverter current during the start up procedure of the induction furnace of FIG. 3.

To determine if the inverter current I has exceeded a pre-determined maximum value, a current limit comparator 95 compares a reference signal from potentiometer 97 with a signal representative of the inverter output current 79. A current transducer 42 is used to create the signal representative of the inverter output current. The microprocessor 50 monitors the output of current limit comparator 95 and switches off the inverter diagonal, as shown in FIG. 5, if the current has exceeded the pre-determined level. Preferably, the processor 50 also sets off an alarm when the current has exceeded the pre-determined level. This current limiting process which occurs within each half cycle can repeat on the next half cycle on a sustained (steady state) basis. The response speed of this limit function is preferably about 25 microseconds or less.

The preferred embodiment of the invention utilizes, as shown in FIG. 6, one pulse per half cycle of the desired output frequency, although a plurality of output pulses could be used, as shown in FIG. 5. Typically, a plurality of output pulses per half cycle can be utilized, particularly in conjunction with lower output frequencies in order to provide a less distorted output waveform.

Figure 7:
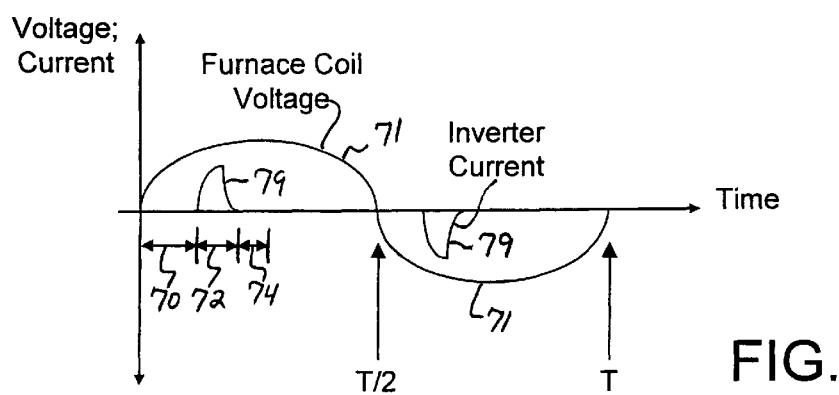
FIG. 7 is a graph showing the waveforms of the induction furnace output voltage and the inverter output current resulting from the use of inverter output delay of the induction furnace system of FIG. 3.

As shown in FIG. 7, the microprocessor 50 can create a time delay, which is preferably variable up to as much as ¼ cycle. The delay is triggered by a detection of a ground voltage crossing of the induction furnace 34. In operation, the delay time is increased or decreased to minimize the peak inverter current for a given power level. The delay time is made the same for the consecutive positive and negative half cycles. The time is preferably variable in increments of 25 microsecond or finer intervals.

The end of the delay time period 70 triggers the inverter current 79. The conduction time 72 can be variable over a range from a few percent of the total time of one-half cycle of the furnace voltage to the full half period. In operation, this pulse width increases as power is increased, and decreases as power decreases. The conduction time 72 for each cycle is made the same for the consecutive positive and negative half cycles. The conduction time 72 is also variable in 25 microsecond or finer steps. The conduction time (T on) will generally be limited by the equation:

$$(\text{Delay} + T_{ON}) \le (T/2) - T_{MARGIN}$$

Where T is the period of the furnace frequency, T/2 is half the period, and $T_{MARGIN}$ 74 is a fixed duration for current switch off, the width of which is preferably set in the range from 150 to 300 microseconds.

Referring back to FIG. 3, the induction furnace control system 10' preferably regulates the output power of the induction furnace coil 34. A power transducer 38 creates a feedback voltage signal proportional to output power, which is applied to a reference power voltage comparator 102. The reference power comparator 102 compares the feedback signal to a reference value which is proportional to the desired furnace power. This reference signal can be obtained from a potentiometer, but the reference should also be settable through a digital communication channel for supervisory control. The output signal from the reference power comparator 102 controls the length of the inverter pulses. The regulator should have settable gain and integral factors for stabilizing the feedback loop if required. If the system does not regulate the power output as in FIG. 1, the width of voltage pulses can be predetermined.

The induction furnace system 10' preferably also includes functions to protect the furnace from extreme current, voltage and frequency limits. If the current reaches a trip level, then a current limit function blocks all switching pulses and an alarm signal is activated. The inverter current limit is determined from the current limit comparator 95, but preferably has a reference voltage programmable through software. When the voltage exceeds a preset minimum level, as determined by comparator 106 or maximum level, as determined by comparator 104, further change of pulse width will not be permitted in the corresponding direction. Over or under voltage trips will occur when the regulator cannot maintain the voltage within the limits. When the measured inverter frequency falls outside the programmed limits, either a maximum frequency or a minimum frequency trip 15 occurs, blocking the inverter pulses and activating an alarm output. The processor determines the inverter frequency from the voltage comparator output 80.

Preferably, an open loop control 60 as shown in FIG. 3 is provided for the microprocessor 50 for checking the hardware and to adjust parameters such as the time delay, the time constant for filter 36 reference voltages, maximum and minimum frequency trip levels, and power, current and voltage reference signals for comparators 95, 46, 55, 106 and 104. The open loop control can comprise a computer being electrically connected to the microprocessor 50 and digitally programmable potentiometers connected to the microprocessor for providing reference voltages. The delay and conduction time adjustments in the open loop control 60 preferably have a 25 microsecond or finer resolution. In the test mode, the possibility of using various input voltages must be provided. This may require for example the ability to input a fixed DC voltage or other means as required.

Figure 9A:
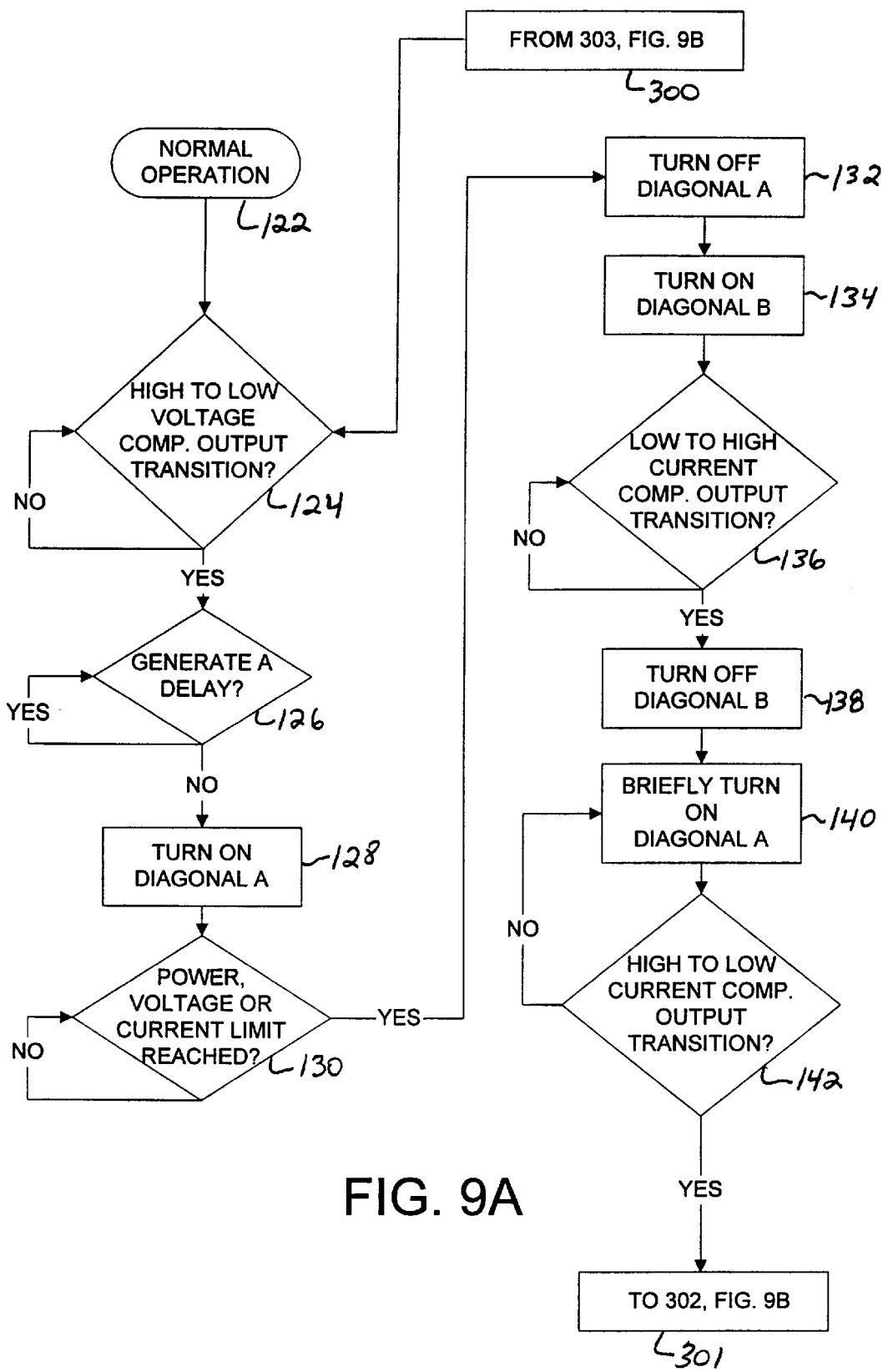
FIGS. 9A and 9B are flow diagrams of the normal operation of the induction furnace of FIG. 3.
Figure 9B:
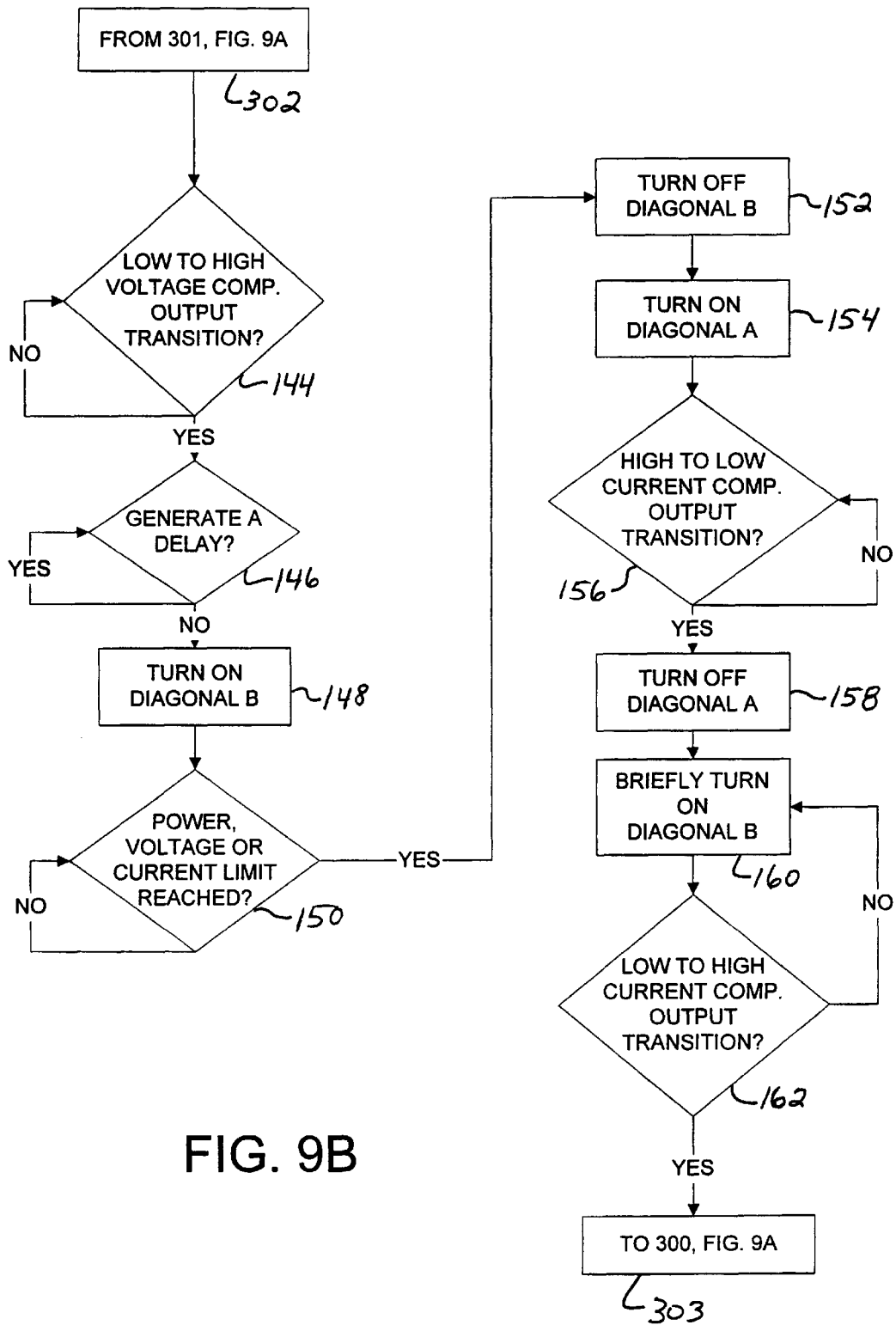

FIGS. 9A and 9B include flowcharts for the normal operation of the induction furnace system 10'. The system initially uses a start up procedure as described above until the system is in steady state operation. During normal operation 122, the processor will wait for a high to low voltage transition from the voltage comparator 46 which signifies a voltage crossing of the furnace coil. A delay will then be initiated 126 if necessary. Diagonal A will be turned on to produce a voltage pulse 128. When the controller receives a signal that the power setpoint has been reached, or a voltage or current limit has been exceeded 130, the system will turn off diagonal A 132.

Diagonal B is then turned on 134, which produces an opposite polarity pulse and forces the output current toward zero. After the output current crosses zero 77 which creates a current comparator output transition 136, diagonal B is turned off 138. Diagonal A is then turned on 140 for only a short time, such as 25 microseconds, which is shown by pulse 86. The system can continue to turn on diagonal A for only a short time 140 until a high to low current comparator transition 142 occurs. Alternatively, a pre-determined routing may automatically turn diagonal A on again for 25 milliseconds to force the current to zero as shown by pulse 84. The control system then waits for the next voltage zero crossing 75 before repeating the same sequence for the opposite diagonal, with diagonal A replacing B in the above example. Reference numerals 300, 301, 302 and 304 are provided for going between FIGS. 9A and 9B.

The processor will wait for a low to high voltage transition 144 from the voltage comparator to being the second half of the furnace coil cycle during normal operation. A delay will then be initiated 146 if necessary. Diagonal B will be turned on to produce a voltage pulse 148. When the controller receives a signal that the power setpoint has been reached, or a voltage or current limit has been exceeded 150, the system will turn off diagonal B 152. Diagonal A is then turned on 154, which produces an opposite polarity pulse and forces the output current toward zero. After the output current crosses zero 77 which creates a current comparator output transition 156, diagonal A is turned off 158. Diagonal B is then turned on 160 for only a short time, such as 25 microseconds, which is shown by pulse 86. The system can continue to turn on diagonal B for only a short time 160 until a high to low current comparator transition 162 occurs. Alternatively, a pre-determined routing may automatically turn diagonal B on again for 25 milliseconds to force the current to zero as shown by pulse 84. The control system then waits 124 for the next voltage zero crossing 75 before starting the sequence for the full cycle again.

As shown in FIG. 5, if a current limit 135 is reached, the switch on period is immediately terminated and the switching continues to sequence as above. If a current limit is reached during the start procedure, then the corresponding diagonal will be switched off. For symmetry, the other diagonal will be switched off at the same timing. Voltage and power limits are also obtained through the regulator functions in the microprocessor controller.

For large inverters, one or more groups of inverter switching devices should be connected in parallel for each half of the single phase inverter bridge. For small inverters, only two groups of inverter switching devices should be used. Preferably, the choice of driver configuration is selectable through software.

Figure 10:
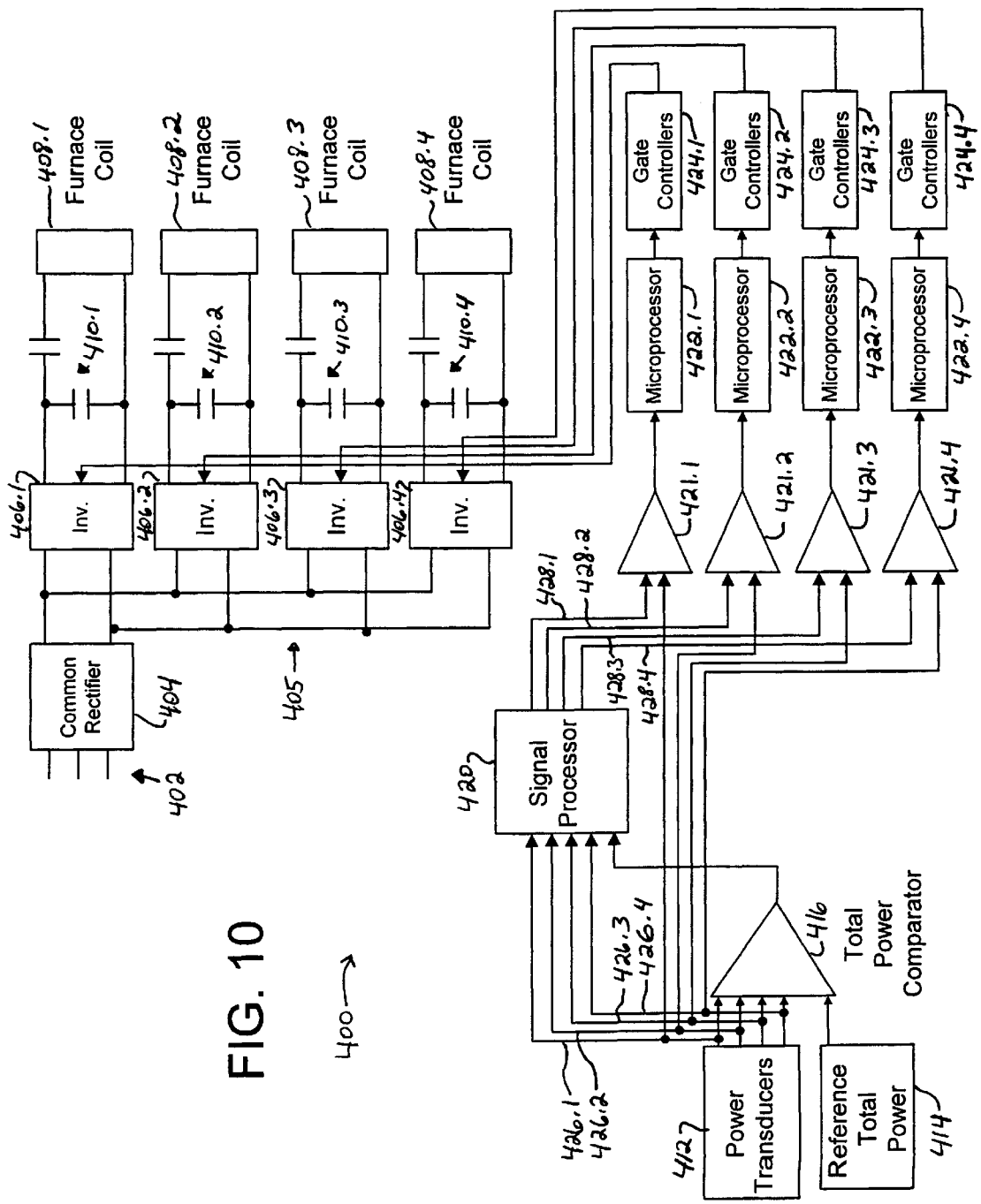
FIG. 10 is a third embodiment of the invention that uses a plurality of inverters connected to a common power source.

A third embodiment of the present invention, shown in FIG. 10, is an induction furnace system 400 having a common power supply 402 that supplies power in any desired proportion to more than one induction furnace.

It should be understood that although FIG. 10 shows the system 400 with four induction furnaces 408 and a common power supply 402, this is not meant to be limiting. Thus, any quantity of induction furnaces 408 can be connected in the manner described.

The system 400 has a common rectifier 404 that supplies rectified power to a common DC bus 405. A plurality of inverters 406.1–406.4 are connected to the common DC bus 405. Each inverter is connected to individual capacitive voltage multiplication circuits 410.1–410.4 which couple electrical power to associated induction furnace coils 408.1408.4 in the manner as previously described.

In the induction furnace system 400, each individual inverter 406.1, 406.2, 406.3, or 406.4 and its associated induction coil and capacitor circuit 410 are rated for the full power of the furnace coil load circuit. However, for a system 400 having a plurality of similar furnace coils, the rectifier 404 preferably has a power rating that is the sum of the maximum power rating of one of the furnace coils plus the minimum power rating of the remaining furnace coils. For instance, if the induction furnace system 400 uses four 1 MW furnace coils each having a minimum power rating of 10 KW, then the rectifier will preferably have a power rating of 1 MW plus three times 10 KW.

A plurality of transducers 412 produces power feedback signals 426.1–426.4 representative of the output power of each inverter 408. Each power feedback signal 426 is applied to summing comparator 416. Alternatively, the power signals 426 could be first totaled and then applied to a standard comparator. A reference signal representing total preferred power 414 is applied to the reference input of comparator 416. The comparator output signal produces a overload signal which is applied to a signal processor 420 when the sum of the inverter powers is greater than the total preferred power.

Signal processor 420 is preferably a programmable logic controller, although other circuits could be used to accomplish the same result.

Signal processor 420 also accepts power feedback signals 426 and determines through software which one is increasing the most over a predetermined time (i.e., requiring more power). Signal processor 420 then sends a reduced reference power signal to each power comparator 421.1–421.4 associated with each control circuit 40, 40' as described above in detail for the first two embodiments of the invention. Each power comparator 421.1–421.4 is connected a corresponding microprocessor 422.1–422.4 each which drives associated gate drivers 424.1–424.4. By providing a reduced reference power signal to a power comparator 421, the corresponding microprocessor 422 shortens the width of the inverter pulse for the corresponding inverter 406. Thus, the power for the corresponding inverter is reduced as would be the case for the first two embodiments of the invention.

For simplicity, only the outputs of each power comparator 421 is shown as an input to each microprocessor 422. Each control circuit 40, 40', however, has been described in detail above for the first two embodiments of the invention and will not be described again.

When the total power comparator 414 in FIG. 10 produces an overload signal, signal processor 420 reduces the power for all inverters 406 except for the inverter associated with the furnace coil 408 calling for more power by reducing the width of the other inverter voltage pulses. This is continued until the sum of the furnace coil power levels does not exceed the total power reference 416. Thus, microprocessors 422 reduce the power to all but one inverter 408 until the power comparator 416 discontinues to produce an overload signal to signal processor 420.

For example, if the summed voltage from the signals representing the inverter powers from lines 426.1–426.4 is greater than the reference voltage representing total preferred power 414, then comparator 416 sends an overload signal to signal processor 420. For instance, signal 426.4 may be increasing the most over time when the overload signal of comparator 416 is present. Then, signal processor 420 will send a reduced power reference signal 428.1, 428.2 and 428.3 to comparators 421.1, 421.2 and 421.3, respectively. The reduced power reference signals 428 may cause some of the comparators to reach their power setpoint, in which case the associated inverter pulse would be turned off and the total inverter power reduced. If power comparator 416 continues to produce an overload signal to signal processor 420, the same power reference signals 428 are reduced again. This continues until power comparator 416 discontinues to produce an overload signal and the power of all furnaces 408 is below the total power reference setpoint.

Figure 11:
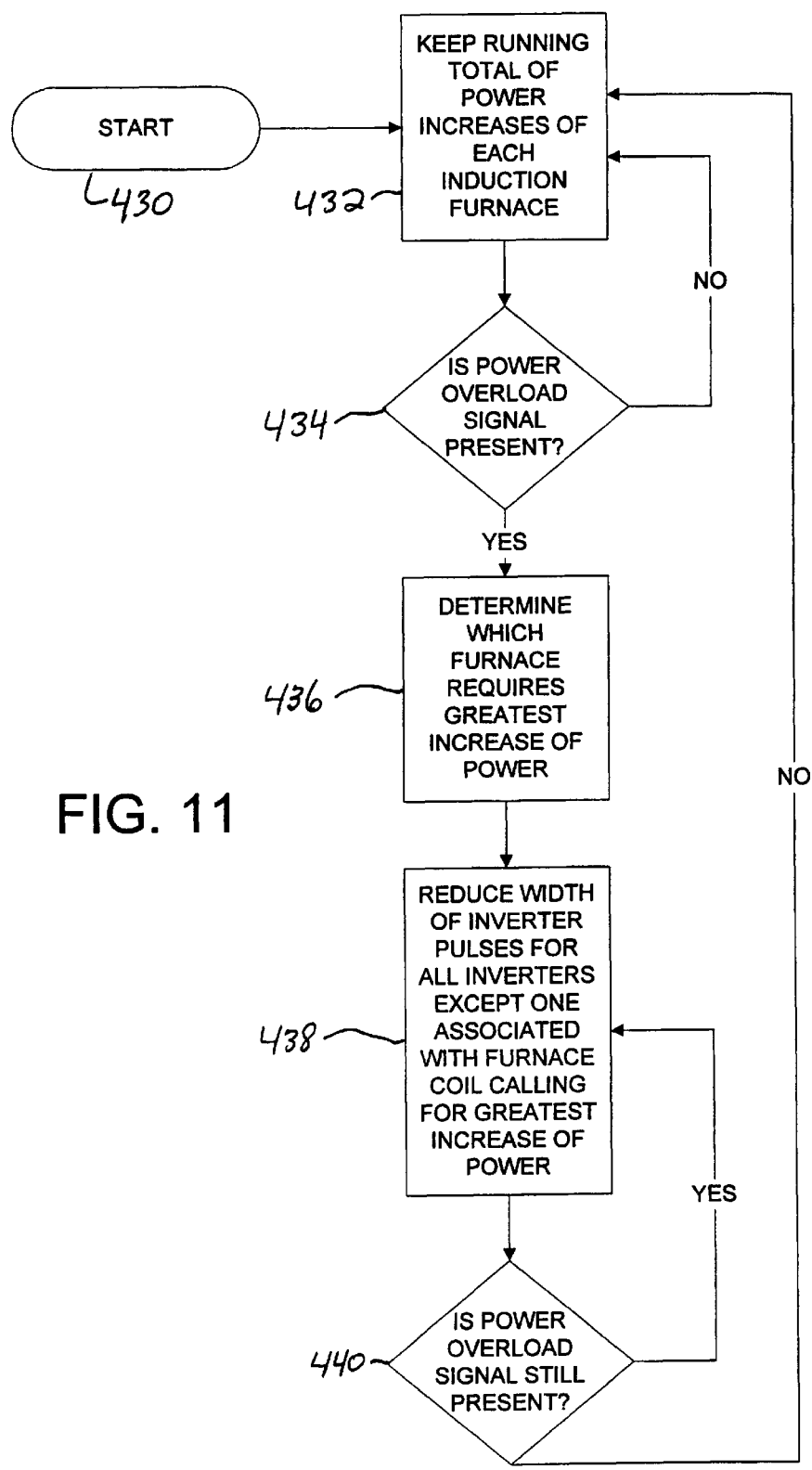
FIG. 11 is a flow diagram of the method of operation of the signal process of FIG. 10.

This method of operation for the signal processor is shown in FIG. 11. After the start 430 of the induction furnace coil system 400, the signal processor keeps a running total 432 of the power increases of each induction furnace. If a power overload signal is present 434, the signal processor then determines which induction furnace requires the greatest increase of power 436. To reduce the total power output, the signal processor then reduces the width of the inverter pulses for all the inverters except the one associated with the furnace coil requiring the greatest increase of power 438. The signal processor then determines if the power overload signal is present 440. If not signal processor continues taking a running total of power increases 432. If it is, then the signal processor continues to reduce the width of the inverter pulses for all the inverters except the one associated with the furnace coil requiring the greatest increase of power 438. This continues until the overload signal is not present, in which case the signal processor continues taking a running total of power increases 432.

The benefit to induction furnace coil system 400 with the plurality of inverters 406 connected to a common power source 402 is that the user can limit the total power limit for a plurality of induction furnaces 408. Thus, the user can minimize the total power demand level used at any time, which can result in cost savings if a power company uses the maximum power demand to calculate the user's charge for the power.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An induction furnace system having a load circuit and being energized by a direct current power source, comprising:
   an inverter having an input electrically connectable to the direct current power source and having electrical output terminals, said inverter producing an alternating inverter output voltage across the load circuit connected to the inverter output terminals;
   the load circuit, comprising:
      a first capacitor bank effectively electrically connected across the inverter output terminals;
      a furnace coil having an inductance; and
      a second capacitor bank effectively electrically connected in series with the furnace coil across the output terminals of said inverter, said first capacitor bank and said second capacitor bank having values of capacitance chosen such that the capacitor banks operate in resonance with the inductance of said furnace coil and such that the capacitor banks divide the inverter output voltage to apply a desired operating voltage across the induction coil.

2. The induction furnace system according to claim 1, further comprising:
   a voltage transformer to sense the furnace coil voltage and produce a first signal indicative thereof;
   a first signal generator that produces a first reference signal representative of a predetermined signal level of the furnace coil voltage;
   a first comparator coupled to compare the first signal with first reference signal to generate a first comparison signal that indicates when the furnace coil voltage crosses a value of the first reference signal to provide an indication of the frequency of the load circuit;

a current transformer to sense the furnace coil current and produce a second signal indicative thereof;

a second signal generator that produces a second reference signal representative of a predetermined maximum voltage coil current;

a second comparator coupled to a second signal representative of the inverter output current and to a second reference signal, said second comparator generating a second comparison signal that indicates when the inverter output current crosses a value of the second reference signal, the second comparison signal being coupled to switch off the inverter output current;

a processor for processing the first comparison signal and the second comparison signal and for producing output pulses; and at least one driver responsive to the processor output pulses for activating the inverter so that its output current goes through said load circuit at a time that is in synchronization with the resonant frequency of the load circuit.

3. The induction furnace system according to claim 1, wherein the inverter is a full bridge inverter using pulse width modulation.

4. The induction furnace system according to claim 3, wherein there are two said drivers for driving the full bridge inverter.

5. The induction furnace system according to claim 1, wherein said inverter further comprises an inductor operatively connected in series between one of the output terminals of the inverter and said load circuit.

6. The induction furnace system according to claim 2, further comprising a current transducer for producing the second signal representative of the inverter output current from the inverter output current.

7. The induction furnace system according to claim 2, further comprising:

a low pass filter for filtering the first signal indicative of the furnace coil voltage to substantially eliminate high frequency noise.

8. The induction furnace system according to claim 1, further comprising a third comparator coupled to compare a third signal representative of a furnace coil power with a third reference signal so as to produce a power error signal that indicates when the furnace coil power exceeds a value of the third reference signal.

9. The induction furnace system according to claim 8, further comprising a power transducer coupled to the furnace coil voltage and an inverter output current to generate the third signal representative of the furnace coil power.

10. An induction furnace system having a load circuit and being energized by a direct current power source, comprising:

a pulse width modulation inverter having an input electrically connectable to the direct current power source and having electrical output terminals, said inverter producing an inverter output voltage across the load circuit electrically connected between the inverter output terminals, said inverter generating an inverter output voltage with an alternating polarity;

the load circuit, comprising:

a first capacitor bank effectively electrically connected across the inverter output terminals; and a furnace coil having an inductance and a second capacitor bank effectively electrically connected in series across the output of said inverter such that said furnace coil and said second capacitor bank are electrically connected in parallel with said first capacitor bank, said first capacitor bank and said second capacitor bank having values of capacitance chosen such that the capacitor banks operate in resonance with the inductance of said furnace coil and such that the capacitor banks divide the inverter output voltage and apply an operating voltage across the induction coil;

a first comparator coupled to compare a first voltage signal representative of a voltage across the furnace coil with a first reference voltage, said first voltage comparator producing a first comparison signal that indicates when the furnace coil voltage crosses a value of the first reference voltage, the first comparison signal for providing an indication of the frequency of the load circuit;

a second comparator for comparing a second voltage signal representative of an inverter output current with a second reference signal, said second comparator producing a second comparison signal that indicates when the inverter output current crosses a value of the second reference signal, the second comparison signal used for switching off the inverter output current;

a processor for processing the first comparison signal and the second comparison signal, said processor producing output pulses; and at least one driver responsive to the processor output pulses for activating the inverter output voltage so that its output current goes through said load circuit at a frequency in synchronization with the resonant frequency of the load circuit.

11. The induction furnace system according to claim 10, wherein said first capacitor bank and said second capacitor bank have values of capacitance chosen such that the capacitor banks operate in resonance with an inductance of said furnace coil.

12. The induction furnace system according to claim 10, wherein said pulse width modulation inverter is a full bridge pulse width modulation inverter.

13. The induction furnace system according to claim 12, wherein there are two said drivers for driving said full bridge pulse width modulation inverter.

14. The induction furnace system according to claim 10, wherein said inverter further comprises an inductor operatively connected in series between one of the terminals of the inverter output and said load circuit.

15. The induction furnace system according to claim 10, further comprising a current transducer for producing the second signal representative of the inverter output current from the inverter output current.

16. The induction furnace system according to claim 10, further comprising:

a voltage transformer for producing the second signal representative of the furnace coil voltage from the furnace coil voltage; and a low pass filter for filtering the first signal representative of the furnace coil voltage to substantially eliminate high frequency noise.

17. The induction furnace system according to claim 10, further comprising a third comparator coupled to compare a third signal representative of a furnace coil power with a third reference signal and for producing a power error signal that indicates when the furnace coil power exceeds a value of the third reference signal.

18. The induction furnace system according to claim 17, further comprising a power transducer coupled to accept a furnace coil voltage signal and an inverter output current signal and for producing the third signal representative of the furnace coil power.

19. A method for operating an induction furnace system having an inverter that has electrical output terminals, the steps comprising:

producing inverter output voltage pulses across a load circuit electrically connected between the inverter output terminals, said inverter capable of alternating a polarity of the inverter output voltage pulses;

providing a first capacitor bank and a second capacitor bank with values of capacitance such that the capacitor banks operate in resonance with an inductance of a furnace coil and such that the capacitor banks divide an inverter output voltage and apply an operating voltage across the furnace coil, the first capacitor bank being effectively electrically connected across the inverter output terminals, the furnace coil and the second capacitor bank being effectively electrically connected in series with the furnace coil across the output terminals of said inverter;

comparing a first signal representative of a furnace coil voltage with a first reference signal by using a first comparator to produce a first comparison signal that indicates when the furnace coil voltage crosses a value of the first reference signal;

comparing a second signal representative of an inverter output current with a second reference signal by using a second comparator to produce a second comparison signal that indicates when the inverter output current crosses a value of the second reference signal;

produce processor output pulses, the processor being provided with the first and the second comparison signals; and activating the inverter by using at least one driver responsive to the processor output pulses to produce the inverter output voltage pulses at a resonant frequency of the load circuit and to produce the inverter output voltage pulses to switch off the inverter output current.

20. The method for operating an induction furnace system according to claim 19, further comprising:

comparing a third signal representative of a furnace coil power with a third reference signal to produce a third comparison signal that indicates when the furnace coil power has exceeded a value of a reference power level;

transmitting a power error signal that indicates when the furnace coil power exceeds a value of the third reference signal potential; and processing the third comparison signal along with the first and the second comparison signals to produce the processor output pulses.

21. The method for operating an induction furnace system according to claim 19, further comprising:

comparing a fourth signal representative of a furnace coil signal frequency with a high frequency limit and a low frequency limit to determine if the furnace coil signal frequency is within the limits; and processing the third comparison signal along with the first and the second comparison signals to produce the processor output pulses.

22. The method for operating an induction furnace system according to claim 19, wherein the inverter has a first diagonal and a second diagonal and uses pulse width modulation to send the inverter output voltage pulses through said load circuit, further comprising the steps of:

applying a short duration voltage pulse from the first diagonal to the load circuit;

applying the short duration voltage pulse from the second diagonal to the load circuit;

increasing a duration of the voltage pulse applied from the first and the second diagonals to the load circuit until a reference power setpoint in the load circuit is reached, wherein each inverter output voltage pulse applied from the second diagonal is identical in duration to the inverter output voltage pulse applied from the first diagonal during one cycle of the resonant frequency of the load circuit.

23. The method for operating an induction furnace system according to claim 19, wherein the inverter has a first diagonal and a second diagonal and uses pulse width modulation to send the inverter output voltage pulses through said load circuit, further comprising the step of:

varying a time delay between a ground crossing of the furnace coil voltage and the inverter output voltage pulse sent through said load circuit, the delay minimizing the inverter output current for a furnace coil power level.

24. The induction furnace system according to claim 1, further comprising:

one or more additional inverters each having electrical output terminals connected across an associated load circuit, each additional inverter having an input electrically connectable to the direct current power source.

25. The induction furnace system according to claim 10, further comprising:

one or more additional inverters each having electrical output terminals connected across an associated load circuit, each additional inverter having an input electrically connectable to the direct current power source.

26. The induction furnace system according to claim 24, wherein the direct current power source includes a rectifier that has a power rating equal to a maximum power rating of one of the furnace coils plus a minimum power rating of each of the other furnace coils.

27. The induction furnace system according to claim 25, wherein the direct current power source includes a rectifier that has a power rating equal to a maximum power rating of one of the furnace coils plus a minimum power rating of each of the other furnace coils.

28. The induction furnace system according to claim 2, further comprising:

one or more additional inverters each having electrical output terminals connected across an associated load circuit, each additional inverter having an input electrically connectable to the direct current power source;

a total power comparator for comparing a total of signals representing a power from said inverter and said additional inverters with a signal representing a total preferred power and for producing an overload signal;

a signal processor for receiving the overload signal and a signal representing a power signal from each furnace coil, said signal processor determining which of said furnace coil and additional furnace coils associated with said additional inverters has a most increasing power signal, said signal processor producing signal processor output signals;

one or more additional processors associated with each additional inverter, each processor producing a processor output; and one or more additional gate drivers associated with each additional inverter and its associated additional processor, each gate drive for receiving one of the additional processor outputs and for controlling the associated inverter of the gate driver.

29. The induction furnace system according to claim 10, further comprising:

one or more additional pulse width modulation inverters each having electrical output terminals connected across an associated load circuit, each additional inverter having an input electrically connectable to the direct current power source;

a total power comparator for comparing a total of signals representing a power from said inverter and said additional inverters with a signal representing a total preferred power and for producing an overload signal;

a signal processor for receiving the overload signal and a signal representing a power signal from each furnace coil, said signal processor determining which of said furnace coil and additional furnace coils associated with said additional inverters has a most increasing power signal, said signal processor producing signal processor output signals;

one or more additional processors associated with each additional inverter, each processor producing a processor output; and one or more additional gate drivers associated with each additional inverter and its associated additional processor, each gate drive for receiving one of the additional processor outputs and for controlling the associated inverter of the gate driver.

* * * * *

UNITED STATES PATENT AND TRADEMARK OFFICE
CERTIFICATE OF CORRECTION

PATENT NO. : 6,163,019
DATED : December 19, 2000
INVENTOR(S) : Daniel Green *et al.*

It is certified that error appears in the above-identified patent and that said Letters Patent is hereby corrected as shown below:

ON THE TITLE PAGE

[75] Inventors: Daniel Green, Clark, N.J.; Robert Ibach, Schwerte; Jan Fabianowski, Dortmund, both of Germany.

Signed and Sealed this

Eighth Day of May, 2001

Attest:

NICHOLAS P. GODICI

Attesting Officer

Acting Director of the United States Patent and Trademark Office